No. 763,053.

Patented June 21, 1904.

UNITED STATES PATENT OFFICE.

HANS A. FRASCH, OF NEW YORK, N. Y.

METHOD OF RECOVERING NICKEL HYDROXID.

SPECIFICATION forming part of Letters Patent No. 763,053, dated June 21, 1904.

Application filed September 12, 1903. Serial No. 172,978. (No specimens.)

*To all whom it may concern:*

Be it known that I, HANS A. FRASCH, a citizen of the United States, residing at New York, in the county of New York and State of New York, have invented a certain new and useful Improvement in Methods of Recovering Nickel Hydroxid, of which the following is a full, clear, and exact description.

The object of this invention is to recover the ammonia and the nickel oxid from the nickel-ammonium chlorid resulting from the production of caustic alkali from alkali chlorids by means of nickel hydroxid and ammonia. If this nickel-ammonium chlorid be decomposed by water, ammonium chlorid and nickel hydrate result, the nickel hydrate being rather voluminous, retaining a large quantity of water. If the nickel hydrate be boiled, it reacts more slowly and still retains a large quantity of water which cannot be removed by the ordinary means, such as filtration. Such nickel hydrate, if used in the process of making caustic soda by adding it to ammoniated salt brine, dilutes the latter greatly by reason of the water it contains, and after a certain amount of caustic soda has been produced more or less of the nickel-ammonium chlorid forming during the process is reverted by the caustic soda, in consequence of which the yield of caustic soda in solution and the strength of the caustic liquor is reduced, while reaction between the nickel oxid, ammonia, and sodium chlorid is incomplete, and what nickel-ammonium chlorid is obtained is of a bulky nature and hard to separate from the caustic soda.

I find that nickel oxid, by means of which better yields may be obtained, may be recovered from nickel-ammonium chlorid by subjecting the latter to dry distillation or by conducting a wet distillation in presence of a dehydrating or water-abstracting agent, such as calcium chlorid, sodium chlorid, or any other water-absorbing salt, whereby the ammonia is expelled and recovered and nickel hydrate remains admixed with or suspended in a solution of whatever nickel chlorid or ammonium chlorid may be present, together with the ingredient which may have been used for the purpose of dehydration.

If dry distillation be employed to remove the ammonia, the insoluble nickel hydrate is eventually separated from the soluble constituents by bringing them in solution—as, for example, by the addition of water or salt brine or suitable solvent—and removing them by filtration or other suitable means, and, if required, washing the remaining nickel hydrate with concentrated salt brine. Again, if distillation of the ammonia be conducted by suspending the nickel-ammonium chlorid in concentrated salt brine or calcium-chlorid solution the soluble constituents after the ammonia has been expelled are separated from the nickel hydrate in the same way—that is to say, by filtration or other suitable means. The nickel which is in the solution with the soluble constituents in form of chlorid is recovered by precipitating it from the solution by means of calcium hydrate or other well-known suitable reagents, while the ammonium chlorid present in the solution is subjected to the ordinary means of distillation with lime.

To carry out the process, I may treat ammoniated salt brine with nickel hydroxid obtained, as above stated, from nickel-ammonium chlorid in a vessel or column which before or after reaction is supplied with an amount of common salt greater than could be dissolved by the salt brine employed, so that a sufficient amount of sodium chlorid is present in the bottom of the vessel to serve as a filtering medium in place of sand or other material. When the reaction which takes place is completed, the caustic liquor is filtered through the body of sodium chlorid present in the vessel and concentrated. The nickel-ammonium chlorid remaining on the filter after being washed with ammoniated salt brine is subjected dry or in presence of salt brine or calcium chlorid to heat, and the vapor carrying the ammonia is utilized to ammoniate fresh quantities of salt brine or nickel hydrate. When the ammonia has been removed from the nickel salt, the contents of the filter are washed with salt brine and the soluble constituents are removed. The nickel hydrate remaining in the filter is returned to the caustic process to be again treated with fresh quantities of ammoniated salt brine. The nickel chlorid contained in the filtrate is treated with a sufficient quantity of ammonia, caustic soda, or calcium hydrate to precipitate the nickel in form of nickel hydrate or nickel-ammonium chlorid, as may be desired, the precipitate being recovered by filtration and returned to the process.

If calcium chlorid be employed to carry out the process, the nickel-ammonium chlorid is introduced into calcium-chlorid solution and boiled until the ammonia has been expelled, the nickel hydrate, which separates during the process of distillation, being recovered by filtration, washed with concentrated salt brine, and returned to the process. The nickel chlorid contained in the solution of calcium chlorid is then treated with a suitable reagent to precipitate the nickel in form of hydrate or nickel-ammonium chlorid, which then is recovered by filtration or other suitable means and returned to the process. The same calcium-chlorid solution may be employed repeatedly, the ammonium chlorid contained therein being eventually returned to the process as ammonia by the addition of a sufficient quantity of calcium hydrate and subsequent distillation, or it may be allowed to crystallize and in this manner be separated.

By this method the presence of a water-absorbing agent—such as sodium chlorid or calcium chlorid—during the distillation of the ammonia and precipitation of the nickel oxid prevents excessive hydration of the nickel oxid, and quick-acting freshly-precipitated nickel hydroxid is always available for the process, assuring a large yield of caustic soda and a nickel-ammonium chlorid of dense structure which will admit of easy filtration.

What I claim is—

1. The method of recovering nickel hydroxid from nickel-ammonium chlorid, which consists in subjecting the nickel-ammonium chlorid to dry distillation, thereby expelling the ammonia, bringing the remaining nickel chlorid into solution in presence of a dehydrating agent, and precipitating the nickel hydroxid by the addition of a suitable precipitant.

2. The method of recovering nickel hydroxid and ammonia from nickel-ammonium chlorid, which consists in subjecting the nickel-ammonium chlorid to the action of heat in presence of a dehydrating agent, and thereby expelling the ammonia, dissolving the remaining nickel chlorid together with the dehydrating agent in a suitable solvent, and precipitating from the solution the nickel hydrate by the addition of a precipitant.

3. The method of recovering nickel hydroxid and ammonia from nickel-ammonium chlorid, consisting in subjecting the nickel-ammonium chlorid suspended in a solution of calcium chlorid to the action of heat, thereby expelling the ammonia and precipitating nickel hydrate, separating the solution from the nickel hydrate, and precipitating the nickel remaining in the solution, by the addition of a suitable reagent.

4. The method of recovering nickel hydroxid and ammonia from nickel-ammonium chlorid, consisting in subjecting the nickel-ammonium chlorid suspended in a solution of calcium chlorid to the action of heat, thereby expelling the ammonia and precipitating nickel hydrate, separating the solution from the nickel hydrate, and precipitating the nickel remaining in the solution, by the addition of a suitable reagent, and finally recovering the ammonia from the ammonium chlorid contained in the solution by the addition of calcium hydrate and subsequent distillation of the ammonia.

In testimony whereof I have hereunto set my hand this 11th day of September, A. D. 1903.

HANS A. FRASCH.

Witnesses:
 WM. H. FINCKEL,
 ADA C. BRIGGS.